United States Patent [19]
Badger et al.

[11] 3,883,369
[45] May 13, 1975

[54] BATTERY ASSEMBLY MACHINE

[75] Inventors: John P. Badger, Genoa; William H. Strater, Toledo, both of Ohio

[73] Assignee: Eltra Corporation, Toledo, Ohio.

[22] Filed: Dec. 26, 1973

[21] Appl. No.: 427,737

[52] U.S. Cl. .............. 136/176; 156/272; 156/285; 152/380
[51] Int. Cl. ..................... H01m 35/18; B29c 19/02
[58] Field of Search .......... 156/272, 380, 285, 498, 156/499, 304; 136/175, 176, 170

[56] References Cited
UNITED STATES PATENTS

| | | | |
|---|---|---|---|
| 2,665,738 | 1/1954 | Caskin | 156/499 |
| 3,053,726 | 11/1962 | Larson et al. | 156/304 |
| 3,347,729 | 10/1967 | Seefluth | 156/498 |
| 3,627,617 | 12/1971 | Schaumburg | 136/176 |
| 3,682,748 | 8/1972 | Kimball | 156/499 |
| 3,684,582 | 8/1972 | Roberts | 136/176 |
| 3,686,056 | 8/1972 | Fiandt | 136/176 |
| 3,778,314 | 12/1973 | Kano et al. | 136/176 |

*Primary Examiner*—Douglas J. Drummond
*Attorney, Agent, or Firm*—Vincent L. Barker, Jr.; Thomas M. Freiburger

[57] ABSTRACT

A sealing machine and method for uniting a thermoplastic battery case and cover is disclosed. The machine utilizes banks of infra-red heat lamps interposed between the opposed surfaces of the battery case and the cover suspended above, thus producing heat softened, tacky surfaces on the case and cover. The covers to be assembled are held by a vacuum actuated platen which is raised, suspended and lowered automatically by programmed means including air cylinders. A carousel rotates a battery supporting surface as well as the air cylinders and platens, with successive stations being provided for loading, raising of the cover, infra-red heating, lowering of the cover and application of pressure, and unloading of the assembled battery.

12 Claims, 6 Drawing Figures

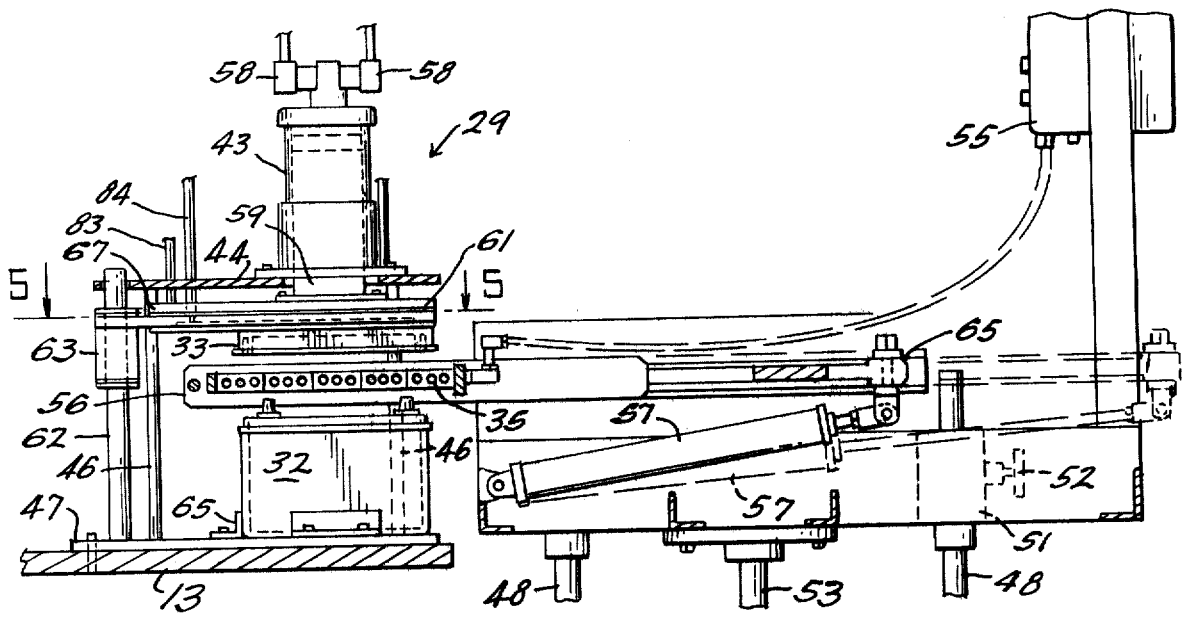
FIG-3-
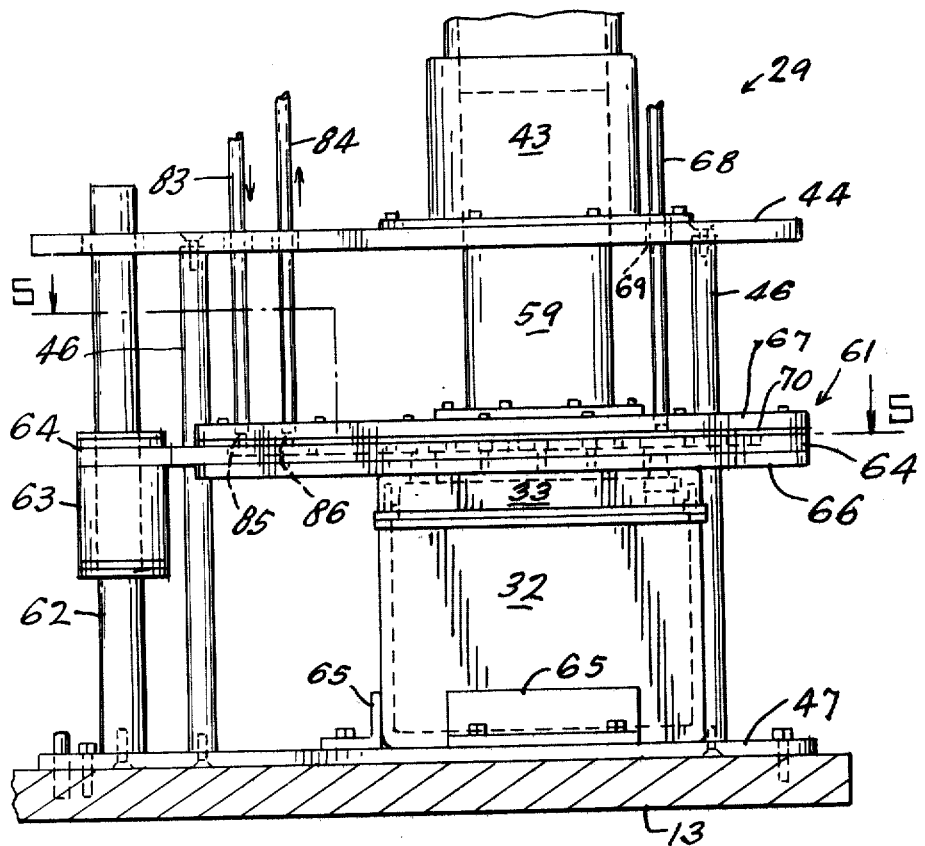
FIG-4-

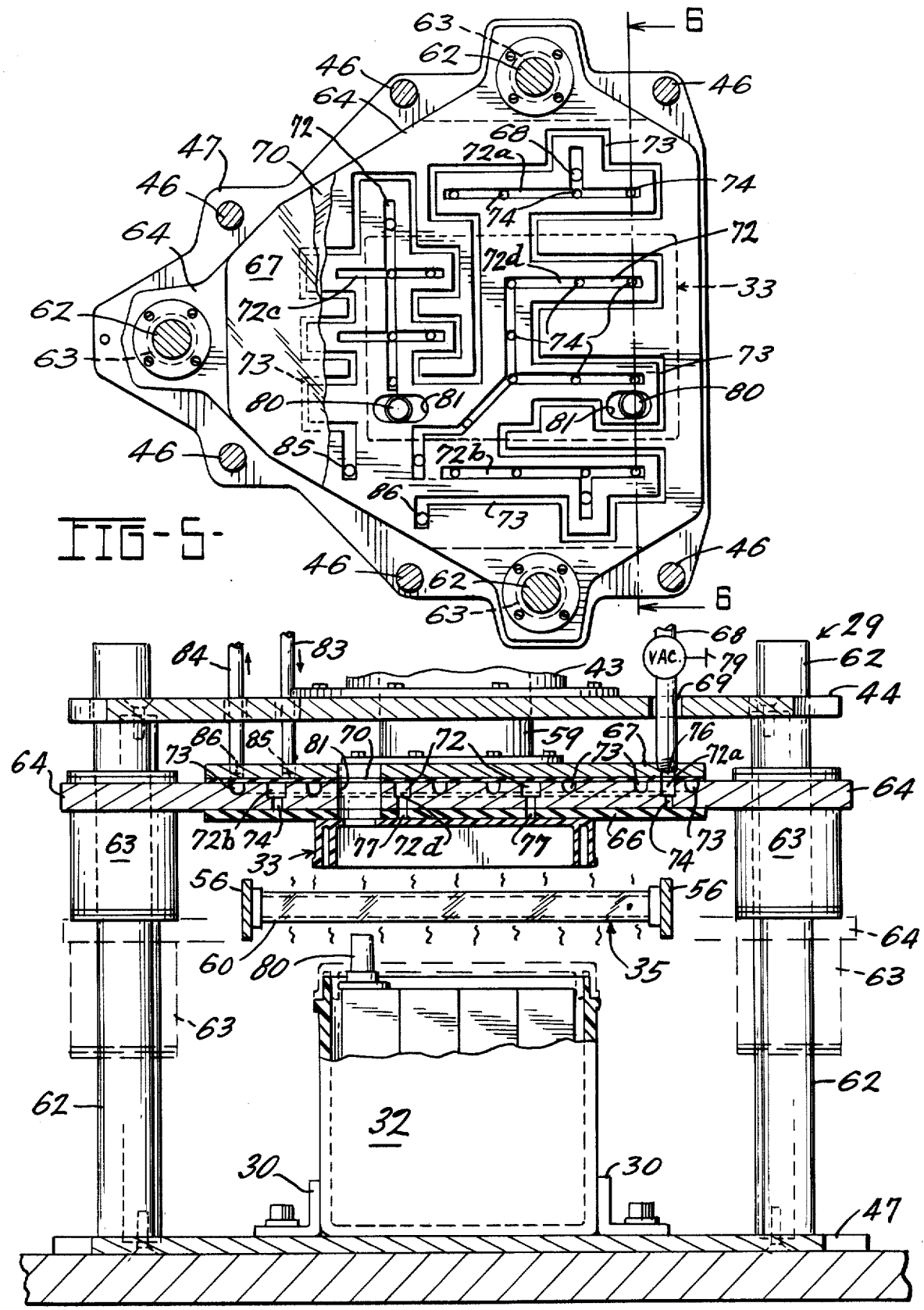

BATTERY ASSEMBLY MACHINE

BACKGROUND OF THE INVENTION

The invention relates to a storage battery assembly machine, and more particularly, to a method and apparatus for sealing a thermoplastic battery cover and case together.

The assembly of battery covers and cases is generally accomplished by means of either adhesive sealing or heat sealing. The latter is used in the case of thermoplastics, and has been commercially practiced utilizing machinery in which a heated platen is placed in contact with the opposed cover and box surfaces to produce the required tackiness. See, for example, U.S. Pat. No. 3,778,314.

Adhesive sealing is a cumbersome and expensive process. Since each cell in a battery must be sealed off by contact with the battery cover, adhesive must be applied around the periphery of each cell as well as around the periphery of the entire battery box. This requires extra assembly time or intricate adhesive-applying equipment custom-fitted to each battery design, or both.

Thermoplastic sealing by means of hot contacting platens is also troublesome and expensive. The heating platen tends to stick to the melted plastic during contact, requiring very critical adjustment of heat, timing and pressure and often requiring shutdowns and platen cleaning operations, even with coated or especially treated platens. Also, since both the battery cover and case must be heated for good bonding, complex motion is required. If one heating platen is used for both cover and case, the platen must move into contact with the case, followed by the motion of the cover into contact with the platen, or both cover and case must simultaneously converge upon the heating platen. As in the case of adhesive sealing, heating platens must be custom-fitted for each battery size since all edges surrounding the battery box and individual cells must be heated.

Another problem arises with heating platens when the battery case and cover to be sealed are of different colors, or even of a different density of the same material. Darker colors absorb radiant heat faster, so that either contact time of case and cover must be varied, or separate platens must be used, necessitating further complexities of equipment, controls and set-up time when changing from one line to another.

SUMMARY OF THE INVENTION

The present invention provides a battery case and cover sealing method and apparatus which obviates the need for direct contact of such components with any kind of platen or adhesive applicator. Banks of quartz infrared heat lamps are utilized to heat the thermoplastic battery case and cover surfaces to the desired tackiness by radiation. A heat lamp bank is physically spaced between a case and a spaced apart, opposed suspended cover, providing for universal application to various battery sizes and cell partition configurations. The lamp banks are vertically adjustable, which enables them to accommodate batteries with case and cover of varied colors. Darker colored thermoplastic materials will absorb more heat at a given distance from the lamps than will lighter colored materials. Thus if a white cover is to be sealed to a black case, the lamp banks can be adjusted vertically to be closer to the cover than to the case, such that a given optimum position for precise equal heating can be developed for all combinations of case and cover.

For lifting and suspending of the battery cover above the case, the present invention includes a vertically reciprocable platen which is shaped to engage the upper surface of the cover and to lift the cover by means of a vacuum applied through the platen. The platen is connected to a reciprocable piston of a pneumatic cylinder above, the action and stroke of which are adapted to lift a loosely held battery cover off a case and elevate it to a heating position, hold the cover in such position, thence lower the cover back onto the case, and then apply a downward clamping pressure to insure good thermoplastic bonding between the cover and case.

The above described cover handling apparatus is provided at each of a plurality of stations on a revolving carousel-type stand and rotates with the stand itself. The stations include a loading station, several heating stations wherein lamp banks can be interposed between battery case and cover, several clamping stations, and an unloading station. A conveyor type loading device is provided to place a battery and its loosely assembled cover upon the carousel stand at a station advanced from the first heating station. A reciprocating unloading device is positioned at an unloading station subsequent to the last heating station to remove the sealed battery and cover combination from the carousel. An indexing means actuates the cover handling apparatus and the lamp banks and the loader and unloader in sequential coordination with advancments of the carousel, as will be explained below.

BRIEF DESCRIPTION OF THE DRAWINGS

FIG. 3 is an enlarged elevational view of a reciprocating lamp bank mechanism shown with lamps extended into a carousel station in heating position;

FIG. 4 is an enlarged elevational view of one of the vertically movable platens which left the battery covers from their cases;

FIG. 5 is a plan view of the top of a platen taken along the line 5—5 of FIG. 4; and FIG. 6 is an enlarged, partially sectioned elevational view of the battery handling apparatus, taken along the line 6—6 of FIG. 5, and showing a battery case and its suspended cover in heating position with the lamp array interposed therebetween.

DESCRIPTION OF THE PREFERRED EMBODIMENT

Figure 1:
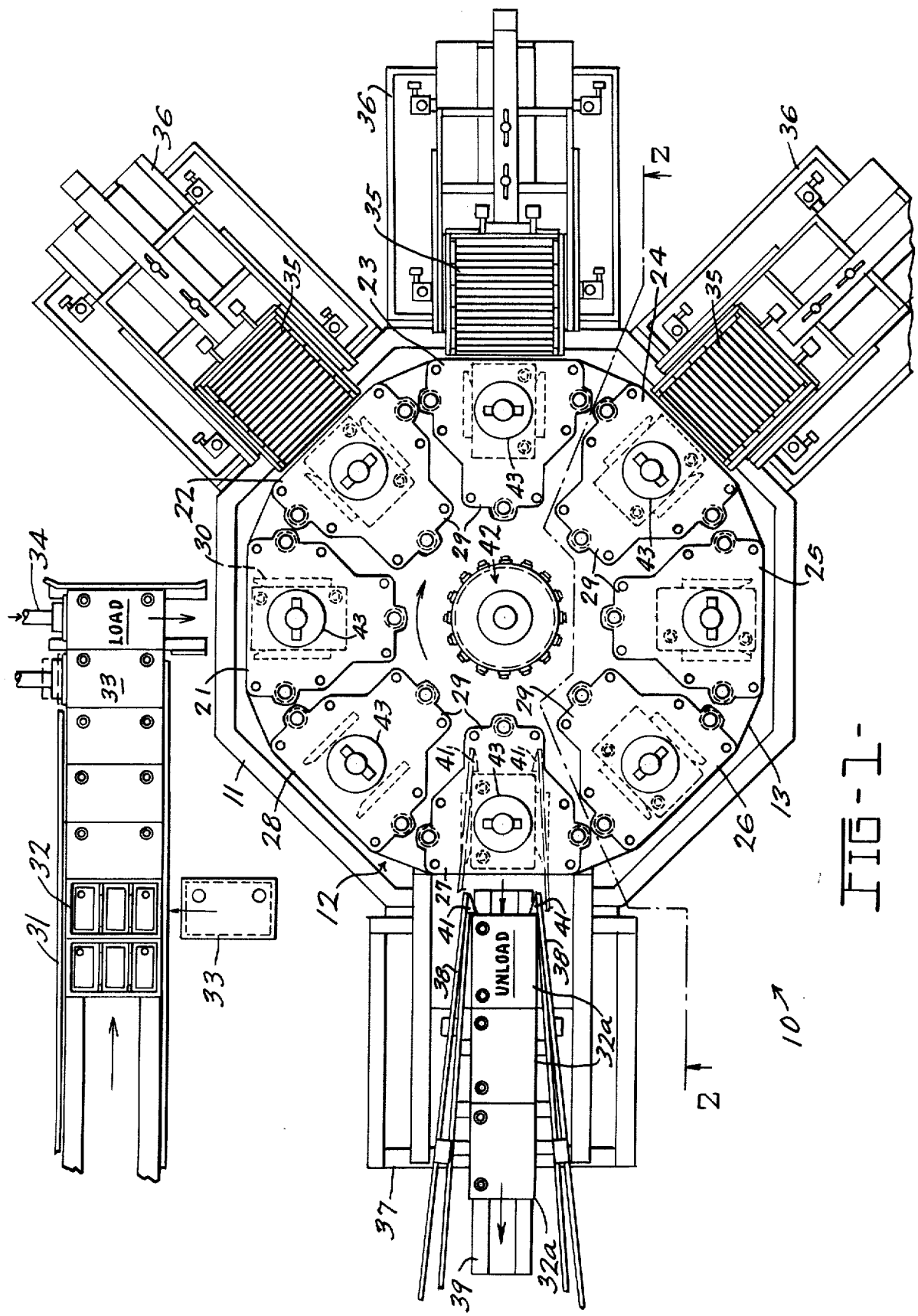
FIG. 1 is a plan view of a battery cover sealing machine of the present invention, showing the carousel stand with the various loading, unloading, and heating mechanisms adjacent thereto.

FIG. 1 of the drawings indicates in plan view the battery cover sealing machine of the present invention, generally indicated by the reference number 10. A stationary base 11 supports a revolving carousel 12 which includes an indexing table 13 having a plurality of indexed stations 21 through 28. Each station includes identical battery cover and case handling apparatus 29, the movement and operations of which vary at and between different stations. As shown, there are eight stations but there can be more or less depending upon the desired cycle of the machine. In the eight station embodiment shown, station 21 is a loading station, stations 22–24 are heating stations, stations 25–26 are clamping stations, station 27 is an unloading station, and station 28 is a vacant or clean-out station.

A battery loading conveyor 31 conveys battery cases 32 with loosely fitted covers 33 onto the apparatus 29 at the loading station 21. A reciprocating pusher 34 effects the loading while the carousel 12 is momentarily positioned at rest. As seen in FIG. 1, each battery and cover combination is placed upon the conveyor 31 in identical alignment so that they will fit within adjustable stops 30 on the conveyor and the covers can be picked up by a platen as will be described below. It should be noted that the loading conveyor is generally adjacent the vacant or clean-out station 28 so that a single operator can handle both the loading conveyor and perform what clean-up or maintenance tasks are necessary at station 28. Between the first and second stations 21 and 22, the handling apparatus 29 lifts the battery cover 33 off its case 32 and retains it thereabove, as will be seen in more detail below. At the second, third and fourth stations 22–24, banks of infra-red quartz heating lamps 35 are interposed between the battery cover 33 and case 32 by lamp bank reciprocating mechanisms 36. Between stations 24 and 25, the heated, tacky battery case and cover 32 and 33 are rejoined by lowering of the cover 33 onto the case 32.

Downward pressure is applied at stations 25 and 26 to assure a good thermoplastic bond. Between stations 26 and 27, the pressure is released and at station 27 an unloading device 37 removes assembled batteries. The unloading device 37 includes a pair of spring loaded arms 38 which reciprocate from the upstream end of an unloading conveyor 39 to a position of engagement with a battery on the carousel at the unloading station 27. Tapered catches 41 on the arms 38 spread laterally as they pass over a battery, then converge to engage the end of a battery as shown in phantom in FIG. 1. This unloading device or extractor may be reciprocated by a hydraulic, pneumatic or other reciprocable mechanism which is timed to insert the arms 38 into the unloading station 27 until they latch about a battery and thence retract them radially outwardly from the station 27 until the battery rests upon the unloading conveyor 39, all being accomplished while the carousel is at rest between its successive indexing movements. The extractor mechanism is shown with a pneumatic cylinder actuating mechanism 40 at the left-hand side of FIG. 2 in its retracted position with the arms 38 free and clear of the carousel stations so that the carousel may be indexed in this retracted position.

Figure 2:
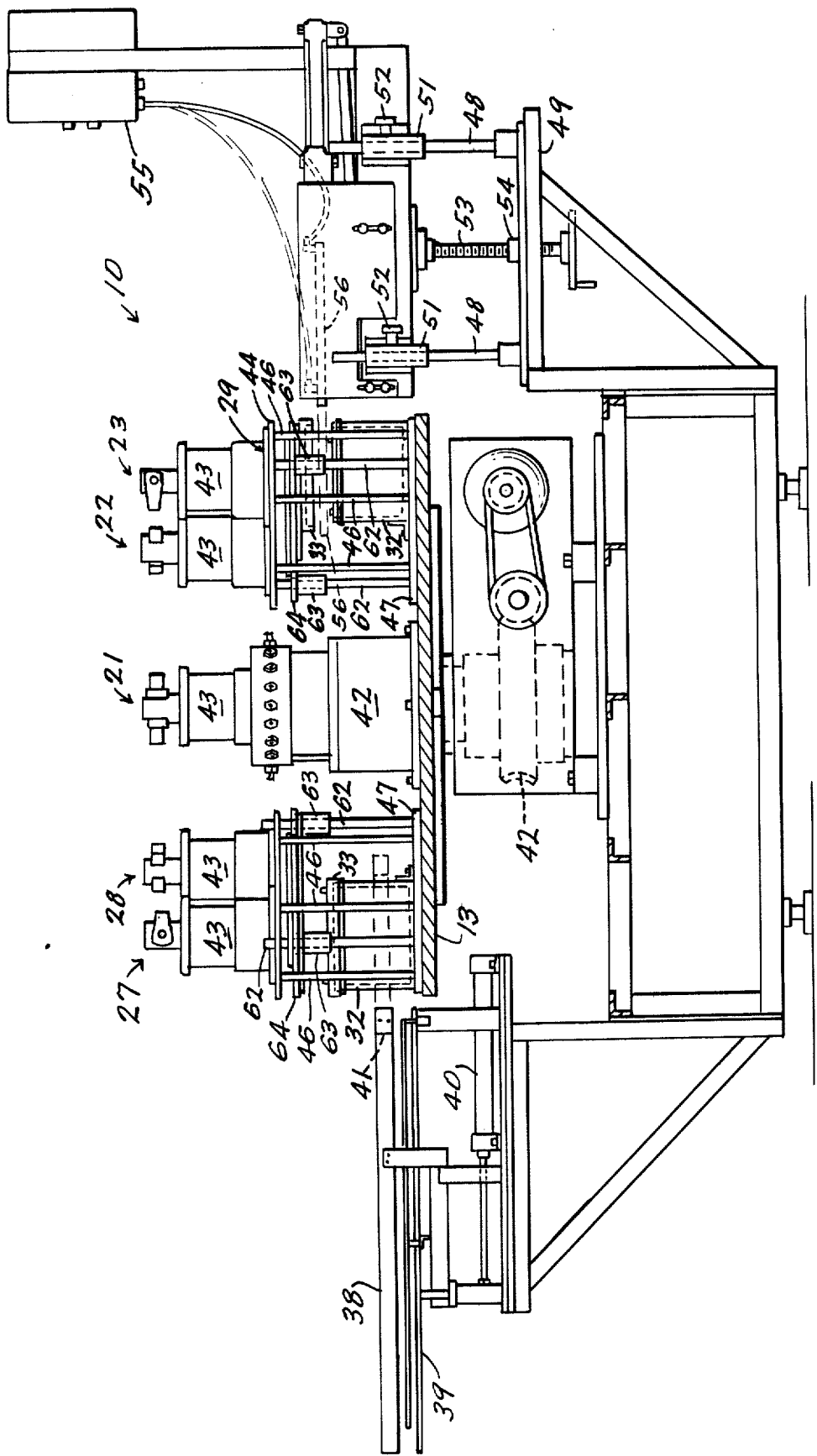
FIG. 2 is an elevational view of the sealing machine taken along the line 2—2 of FIG. 1.

FIG. 2 is an elevational view of the sealing machine 10, as seen along the line 2—2 of FIG. 1. The revolving index table 13 is shown connected to an indexing mechanism 42 which incrementally rotates and controls the function of the battery handling apparatus 29 from station to station. The indexing mechanism 42 is shown operably connected to an electric motor M which has suitable controls to drive the mechanism 42 and thus the table 13 in sequential steps with the length of the steps, the table speed, and the pause or time between steps being programed with suitable electromechanical controls. Such controls are known to those skilled in the art and do not themselves form a part of this invention.

Each battery handling apparatus 29 includes a pneumatic cylinder 43 supported by an upper platform 44 which is in turn supported in a fixed position above the index table 13 by a plurality of support rods 46. A revolving base plate 47 affixed to the index table 13 provides a lower mounting for the rods 46. The battery handling apparatus 29 is seen in greater detail in FIGS. 3–6, discussed below.

Also indicated in FIG. 2 is an adjustable support means for the reciprocating lamp bank mechanism 36. Vertical support rods 48 extend upward from a fixed platform 49 to the mechanism 36 where they are received by guide sleeves 51 having set screws 52 for locking the mechanism 36 in at a desired height. A threaded adjusting rod 53 is screwed into a collar 54 of the fixed platform 49 and is manually rotatable to raise, lower and finely adjust the vertical position of the reciprocating lamp bank mechanism 36. A power supply box 55 with its flexible power leads is positioned adjacent the bank mechanism 36 and contains suitable circuitry for supplying the desired power for the lamp bank 35.

Referring to FIG. 3, a lamp bank 35 is shown interposed between a battery case 32 and cover 33 with the lamp bank reciprocating mechanism 36 in extended position. Reciprocation of the bank 35 is effected by a pair of pneumatic pistons 57 connected to the slideably mounted lamp bank 35 as shown. The pistons 57, controlled by the indexing mechanism 42, have a stroke sufficient to draw the lamp bank 35 outwardly far enough to clear the vertical support rods 46 on the apparatus 29 as it is indexed from one station to the next, as seen in FIG. 1, or to insert the lamp bank 35 within a station in the index table 13 so that it is fully interposed between a battery case 32 and cover 33, as shown in FIG. 3.

FIG. 6 provides a sectional view of the lamp bank 35 heating the battery case 32 and cover 33, as it would be seen when looking radially inwardly into a heating station 22–24. Slide mounts 56 retain the individual elongate infra-red quartz lamps 60 together in the lamp bank 35. The slide mounts 56 are guided in their reciprocating movement by a fixed channel 65, shown in FIG. 3, which is secured relative to the vertical adjustment mechanism including the threaded adjusting rod 53 and its associated parts described above. One end of the pneumatic piston 57 is pivotally secured to an extension of the slide mounts 56 to accommodate vertical adjustment of the slide mounts 56 and their quartz infra-red lamps 60.

FIGS. 3–6 show the battery cover and case handling mechanism in greater detail. Mounted on top of the main vertical cylinder 43 which is secured above the index table 13 are a plurality of air solenoid valves 58 which control the action of a piston 59 whose lower end is secured to a vertically movable vacuum platen 61. As best seen in FIG. 6, the plurality of vertical platen guide rods 62 extend upwardly from the base plate 47 of the index table 13 and help support the upper platform 44 which remains at a fixed height above the base plate 47. The vacuum platen 61 is slidably guided for vertical movement by the guide rods 62 which extend through bearing sleeves 63. In the condition shown in FIG. 3, the platen 61 is shown in an upper position with the piston 59 retracted. In this condition, a battery cover 33 held by the platen 61 is above the horizontal plane of reciprocal movement of the lamp bank 35.

In FIG. 4, the platen 61 and its associated parts are shown in a downward, clamping position, as it would function while it is indexed through the clamping stations 25 and 26. The piston 59 is extended by air pressure so that the platen 61 pushes the cover 33 firmly and squarely upon its case 32 which is firmly and rigidly held upon the base plate 47 between the adjustable stops.

As best seen in FIGS. 4, 5 and 6, the vacuum platen 61 is comprised of several assembled component plates. A guide plate 64 connected to the bearing sleeves 63 supports a gasket 66 mounted on its lower surface for providing vacuum seal upon the battery cover 33 during vacuum application. Connected above the guide plate 64 is an upper plate 67 through which a vacuum line 68 extends and to which the piston 59 is mounted. The vacuum line 68 passes loosely through an opening 69 in the upper support platform 44 which does not reciprocate with the platen 61.

As indicated in FIG. 5, which shows the upper surface of guide plate 64, channels 72 and 73 are provided. The plurality of non-connected channels 72 are each connected to a source of vacuum through the line 68 and communicate with a large number of bores 74 extending through the guide plate 64 for exerting a vacuum on a battery cover 33 below. Each of the vacuum channels 72a-72d shown in this embodiment is in communication with the vacuum line 68 connected into a bore 76 in the upper plate 67, as shown in FIG. 6. For sealing of the channels 72 and 73, a gasket 70 is interposed between the guide plate 64 and upper plate 67, which are preferably bolted together. (A vacuum line 68 is provided for each vacuum channel 72, but only one line 68 is indicated in FIGS. 3, 4 and 6.) As shown in FIGS. 5 and 6, the area encompassed by the vacuum channels 72a through 72d is large enough to handle battery covers larger than the cover 33. For a particular battery cover 33, a special gasket 66 adhesively retained to the underside of the guide plate 64 is employed. For a given battery cover of the size shown in broken line in FIG. 5, that gasket is shaped to close or seal off all vacuum holes or bores 74 which fall outside the edges of the battery cover 33. For those vacuum bores 74 within the area of the battery cover 33, the gasket 66 has a corresponding bore 77 in alignment therewith. it is through these bores 77 that the required suction is provided for retaining the battery cover 33 to the platen 61. Entire vacuum channel sections such as the sections 72a and 72b of FIG. 5 which lie outside the battery cover area are shut off from vacuum by means of valves 79 in the vacuum lines 68. Thus the platen 61 of this preferred embodiment can be adapted to handle any size battery cover by merely installing a cut gasket to properly position all appropriate vacuum bores 74 over a portion of the cover.

Referring again to FIGS. 5 and 6, accommodation is made in the apparatus 29 for upwardly protruding battery terminal posts 80 or other extensions on the cover surface through the provision of recesses 81 in the gasket 66, guide plate 64, gasket 70 and upper plate 67 where necessary. The terminal posts of most batteries will fit the post spacing provided by the elongate recesses 81; if a battery having variant post spacing is to be sealed, the plates 64 and 67 may be interchanged for others. When side terminalled batteries are to be assembled, recesses 81 are not necessary but need not be eliminated since they do not communicate with nor affect the vacuum system.

Referring again to FIG. 5, a continuous serpentine passageway 73 channeled into the surface of the guide plate 64 provides a path of travel for a cooling fluid. The coolant, preferably air or water, enters the passageway 73 through an inlet line 83 and exits through an outlet line 84, both of which communicate with the passageway 73 through bores in the upper plate 67 and the gasket 70. The inlet line 83 communicates with one end 85 of the passageway 73, and the outlet line 84 communicates with the other end 86. Coolant is provided in order to cool and quickly seal the united battery cover 33 and casing 32 during clamping at stations 25 and 26 of the apparatus 10.

From the above description, operation of the machine should be apparent but is briefly outlined below with respect to the assembly of a single battery as it enters the machine at loading station 21. While the machine is at rest, the pusher 34 associated with the loading conveyor 31 extends to place a battery case 32 with its loosely associated cover 33 on the base plate 47 of the index table 13 in the desired position as determined by the position of jigs or stops 30 The pusher 34 is retracted and the vacuum platen 61 is lowered by actuating cylinder 43 to place the platen upon the cover 33. Just before the gasket 66 of the platen 61 makes contact with the cover 33, the vacuum system is actuated so that the suction applied in the vacuum system will cause the cover 33 to adhere to the platen 61. The platen 61 and cover 33 are then raised to their elevated or suspended position as shown in FIG. 6. The battery 32 and suspended cover 33 are then rotated to heating station 22.

With the battery cover 33 suspended above the battery 32 and at rest at station 22, an infra-red heat lamp bank 35 is thrust inward between the cover 33 and case 32 by the reciprocating mechanism 36, as illustrated in FIGS. 3 and 6. The lamps 60 are energized for a predetermined period, then de-energized, and then retracted. The index table 13 moves the still separate battery case 32 and cover 33 to the second heating station 23. Operation of the machine at stations 23 and 24 is identical to station 22 and the heating process is repeated. The duration of heating time at the stations 22 through 24 depends upon the thermoplastic material used, the color of the case 32 and cover 33, and the amount of separation between case 32 and cover 33 during heating, etc. These variables are all programed into the machine by suitable electro-mechanical controls, the details of which do not form a part of this invention.

Following the last heating at station 24, the battery case 32 and suspended cover 33 are moved to station 25. With the index table at rest, the platen 61 lowers the cover 33 upon the case 32 and applies a clamping pressure upon the parts through the pneumatic cylinder 43 and platen 61. This clamping configuration is indicated in FIG. 4. At this point, vacuum is released and the coolant fluid is circulated through the platen 61 to accelerate the cooling time of the assembled battery, as discussed above.

With clamping pressure continued and coolant flowing, the assembled battery is moved to station 26. Coolant and pressure are there continued until the revolving table 13 is again indexed. During the move to the unloading station 27, coolant flow is discontinued and the platen 61 is raised above the assembled battery 32a.

At the unloading station 29, the spring loaded arms 38 are thrust inward and spread open by contact with the battery, then latched over the end of the battery and retracted to the position shown in FIG. 1. There the assembled battery 32a is removed by the conveyor 39.

The time required for a battery to be loaded on the index table 13 at station 21 and for unloading at station 27 is generally shorter than that required for clamping the parts at stations 25 and 26 or shorter than the heating time at stations 22–24. Thus the time at which a battery pauses at each station, which must be the same for all stations, is determined by the heating or clamping time required for the particular battery case and cover. In this preferred embodiment, three heating stations are included in order to divide and thus reduce the heating time required at each heating station. However, under different circumstances, fewer or more heating stations may be provided. Similarly, fewer or more total stations may be provided and the ratio of heating time to pressing time may be varied by altering the number of heating stations or pressing stations or both.

In a preferred commercial embodiment of the above described apparatus, the electro-mechanical controls are set for a fixed speed of rotation or indexing of the table 13 with clamp time and heating time being variable. Heating time is easily controlled by varying the time of energization of the infra-red lamps, leaving the extension and retraction time of the lamp bank 35 constant. Generally, with three heating stations and two clamping stations, the heating time required for a particular battery is the critical variable. Thus the lamp banks 35 are preferably energized for the entire period of their extension. For a particular battery in a commercial embodiment, for example, the lamp energization controls at each heating station 22–24 are set at about six seconds, or a total heating time of eighteen seconds.

In the embodiment described, the time duration for indexing the table 13 and for extension and retraction of the lamp bank arrays 35 or platens 61 is about 1½ seconds; thus, for the total heat time of 18 seconds in the above example, each battery would be under a clamping pressure for 13½ seconds, or about 6 seconds at each of stations 25 and 26 and 1½ seconds during indexing. The machine would index about every 7½ seconds, making the assembly capacity about 8 batteries per minute. As heating time and clamping time increase, the machine capacity, of course, decreases. However, due to the elimination of problems encountered with the prior art practices of adhesive sealing or hot knife contacting of the parts, the effective capacity of the apparatus described is a significant improvement in that maintenance problems have been substantially reduced.

In the preferred embodiment described, each lamp bank 35 consists of an array of 15 single 1000 watt quartz lamps covering a total surface area sufficient to extend over the area of the largest battery to be assembled. In the event that much smaller batteries are assembled on the machine, it may be desirable to disconnect or remove one or more of the outermost lamps to reduce energy consumption.

It should be understood that the various assembly stations described above can be altered to provide one solid fixed upper platform to support the pneumatic cylinders 43, replacing the many support platforms 44 and rods 46 and 62. The need for outward retraction of the lamp banks 35 would thus be eliminated, simplifying the battery assembly machine 10. However, since rather heavy structure would be required to stabilize such an upper platform during clamping at stations 25 and 26, the preferred embodiment employs separate platforms 44 in the battery handling apparatus 29.

The above described preferred embodiment provides a battery cover sealing method and apparatus capable of reducing battery assembly time and expense. Various alterations to this preferred embodiment will be apparent to those skilled in the art and may be made without departing from the spirit and scope of the following claims.

What we claim is:

1. An apparatus for heat sealing together a battery case and cover of a thermoplastic material, comprising, in combination, means for positioning a cover a predetermined distance above the upper surfaces of a battery case and for holding it in such position in alignment with and parallel to the opposed upper surfaces of said case, means for applying radiant heat to the spaced apart opposed surfaces of said cover and case until said surfaces become tacky, including means for adjusting the relative distances of the heat applying means from the cover and case, and means for joining and clamping together said case and cover for a predetermined period until said tacky surfaces become welded together.

2. The apparatus of claim 1 wherein said positioning and holding means comprises a vacuum operated gripping platen positioned above said cover and having means responsive to said indexing means for raising and holding said platen in an elevated position above said case.

3. The apparatus of claim 1 wherein said positioning and holding means and said joining and clamping means comprise a vacuum operated gripping platen positioned above said cover and having means for raising said platen, holding said platen in an elevated position, lowering said platen to a position just above said battery case, and exerting a downward force on said platen to clamp together with battery cover and case.

4. The apparatus of claim 3 which further includes cooling means within said gripping platen for accelerating the bonding between said battery cover and case.

5. The apparatus of claim 4 wherein said cooling means comprises a member within said gripping platen having a serpentine passageway therethrough in communication with a source of fluid coolant.

6. The apparatus of claim 1 wherein said radiant heat applying means comprises an array of infra-red quartz heating lamps, and means for interposing said heating source between said battery case and elevated cover.

7. A method for heat sealing a multicell partitioned thermoplastic battery case to a thermoplastic battery cover, comprising the steps of:

positioning the cover in aligned, spaced parallel relation to upper surfaces of cell partitions and the periphery of the case;

inserting between the case and the cover a radiant heating source;

adjusting the relative distances of the radiant heating source from the case and the cover such that a substantially equal degree of heat absorption takes place in the case and the cover;

energizing said heating source for a predetermined time period;

removing said heating source from between the case and cover;

uniting the case and cover with the cover in engagement with the upper surfaces of the case; and applying a clamping force biasing the cover and the case together and maintaining said force for a predetermined time period to assure a secure thermoplastic bond.

8. The method of claim 7 which further includes serially indexing the battery case and cover from a first working station to a last working station during said steps.

9. The method of claim 7 which further includes the step of cooling the united case and cover to accelerate the thermoplastic bonding.

10. The method of claim 7 wherein said positioning, uniting, and clamping steps are accomplished by contacting the loosely fitted battery cover with a gripping platen exerting an upward vacuum force and raising said platen to position the cover above the case; lowering said platen to unite said cover and case; and exerting a downward force on said platen for a predetermined time period.

11. An apparatus for heat sealing together a battery case and cover of a thermoplastic material, comprising, in combination: a support base having means for aligning thereon a battery case and battery cover loosely fitted on the case; a vacuum operated gripping platen positioned above the battery cover and having a plurality of spaced vacuum openings dispersed throughout a portion of the area of its lower face, said vacuum openings being connected to a source of vacuum, and a gasket member positioned over said lower face portion and having openings therethrough corresponding to such of the vacuum openings positioned above the particular size battery cover to be processed; means connected to the support base for elevating the platen from a position of engagement with the cover wherein the cover is loosely fitted upon the case to a position wherein the cover is held a predetermined distance above the upper edges of the case, for lowering the platen to its former position, and for applying a downward clamping force on the platen to clamp together said battery cover and case; and means connected to the support base for interposing a radiant heat source between the battery case and cover when the battery cover is in its upper position to soften said thermoplastic material to a tacky condition prior to the downward movement of the platen.

12. Apparatus for heating sealing together a battery case and cover of thermoplastic material, comprising, in combination, a plurality of movable work stations mounted on a movable support, each station having means for receiving a battery case with a loosely fitted cover, a vacuum operated gripping platen connected to the support and positioned above the battery case and cover for engagement with the cover, fluid-actuated means for sequentially raising, holding, lowering and exerting a downward force on the platen and vacuum-retained cover as said work stations advance, and means for interposing a source of radiant heat between the case and cover when the cover is in a raised position, until the corresponding surfaces of the case and cover become tacky, said last-named means including means for adjusting the vertical position of the radiant heat source such that the distance of the source from each of the case and cover is in accordance with the heat-absorptive qualities of the case and cover, respectively, to provide for substantially equal degrees of tackiness on the corresponding case and cover surfaces for a given heating time.

* * * * *